United States Patent [19]

Archer

[11] Patent Number: 4,873,107

[45] Date of Patent: Oct. 10, 1989

[54] AIR IMPINGEMENT TUNNEL OVEN APPARATUS

[75] Inventor: Virgil L. Archer, Dallas, Tex.

[73] Assignee: Archer Air Industries, Inc., Dallas, Tex.

[21] Appl. No.: 946,521

[22] Filed: Dec. 24, 1986

[51] Int. Cl.$^4$ .................... A23L 1/01; A23B 4/04; F26B 3/00

[52] U.S. Cl. .................... 426/520; 34/34; 99/474; 99/477; 99/443 C; 126/21 A; 426/523

[58] Field of Search ............... 426/496, 523, 465, 520; 99/473–475, 477, 443 C; 34/34, 33; 126/19 R, 21 A

[56] References Cited

U.S. PATENT DOCUMENTS

| | | | |
|---|---|---|---|
| 2,491,687 | 12/1949 | Nutt | 107/54 |
| 2,674,811 | 4/1954 | Thornburg | 34/213 |
| 2,908,234 | 10/1959 | Naylor | 107/55 |
| 3,125,017 | 3/1964 | Tauber et al. | 99/443 |
| 3,129,072 | 4/1964 | Cook et al. | 34/54 |
| 3,173,384 | 3/1965 | Dersch et al. | 107/57 |
| 3,528,362 | 9/1970 | Arnold | 99/357 |
| 3,721,178 | 3/1973 | Szabrak et al. | 99/386 |
| 3,802,832 | 4/1974 | Nicolaus | 432/128 |
| 3,908,533 | 9/1975 | Fagerstrom et al. | 99/443 C |
| 4,154,861 | 5/1979 | Smith | 99/443 C |
| 4,252,055 | 2/1981 | Johansson et al. | 99/386 |
| 4,336,279 | 6/1982 | Metzger | 427/55 |
| 4,366,177 | 12/1982 | Wells et al. | 426/243 |
| 4,377,109 | 3/1983 | Brown et al. | 99/401 |
| 4,457,291 | 7/1984 | Henke | 126/21 |
| 4,462,383 | 7/1984 | Henke et al. | 126/21 |
| 4,471,750 | 9/1984 | Burtea | 126/21 |
| 4,474,498 | 10/1984 | Smith | 432/144 |
| 4,479,776 | 10/1984 | Smith | 432/144 |
| 4,506,652 | 3/1985 | Baker et al. | 126/21 |
| 4,556,043 | 12/1985 | Bratton | 126/21 |
| 4,576,090 | 3/1986 | Burtea | 99/443 |

Primary Examiner—George Yeung
Attorney, Agent, or Firm—Hubbard, Thurman, Turner & Tucker

[57] ABSTRACT

An air impingement tunnel oven is provided for very rapidly and evenly cooking food items carried horizontally through the tunnel on a suitable conveying mechanism. The oven is provided with upper and lower plenum ducts which are positioned in a vertically spaced relationship within the tunnel so that food items traversing the tunnel pass between them. Vertically facing wall portions of the plenum ducts have cross-sections which are defined by alternate series of generally V-shaped ridges which respectively project toward and away from the interior of their plenum ducts and extend generally perpendicular to the direction of food item travel within the tunnel. A series of rectangular air slots are formed in apex portions of the ridges which project away from their plenum duct interiors. Separate fans are utilized to supply heated tunnel air into the plenums in a direction generally parallel to the ridges therein, the ridges functioning to facilitate even air distribution to the air slots. Plenum air is discharged vertically through the slots and impinges upon upper and lower surfaces of the food items in an overlapping pattern to assure rapid and even cooking of the food items. The upper plenum ducts are vertically adjustable to compensate for height variations in the food items. Additionally, the ridges on the lower plenum duct are sloped and define drain troughs for receiving and draining away liquid falling from the food items. The impingement air supply system may also be used to supply cooling air to the food items.

47 Claims, 3 Drawing Sheets

AIR IMPINGEMENT TUNNEL OVEN APPARATUS

BACKGROUND OF THE INVENTION

The present invention relates generally to cooking apparatus, and more particularly provides tunnel oven apparatus for cooking food items, such as pizzas, in which a substantially improved impingement air delivery system is provided for rapidly, efficiently and very evenly cooking the food items from above and below the same as the food items are moved through the oven. The air delivery system may also be used to efficiently deliver cooled impingement air to the food items, if desired, to rapidly cool them as they traverse the oven's tunnel.

Tunnel ovens are well known in the food preparation industry and basically comprise an elongated horizontal housing through which a cooking chamber or "tunnel" longitudinally extends. The food items to be cooked are moved through the cooking tunnel on a conveyor apparatus which subjects the food items to a predetermined tunnel temperature for a predetermined amount of time. A now-conventional method of supplying cooking heat to the food items moving through the tunnel is the use of heated, high velocity impingement air which is directed against upper and lower surface portions of the moving food items. The high velocity cooking air is delivered in the form of columnar jets having a circular cross-section and a velocity on the order of 8000 feet per minute.

These high velocity columnar jets are formed by utilizing a single fan to supply heated air into the inner ends of duct plenums or "jet fingers" positioned above and below the food conveyor belt and extending generally transversely thereto. The vertically facing surfaces of these upper and lower duct plenums are defined by columnating plates having circularly cross-sectioned jet-forming orifices positioned thereon in a suitably spaced array. Air flow into the upper and lower duct plenums from the single supply fan forces the heated air vertically through the jet-forming orifices in the form of high velocity circular jet columns which strike the upper and lower surfaces of the food items in a substantially undiffused form. This columnar jet impingement scheme is also used to cool food items traversing the tunnel, the only substantial difference being that the air supply to the upper and lower duct plenums is cooled rather than heated.

Despite the widespread use of this impingement air delivery technique, this conventional method of heating or cooling food items conveyed through an elongated tunnel is subject to a variety of well known problems, limitations and disadvantages. For example, the columnated, high velocity, substantially undiffused air jets strike the food items at spaced apart surface locations thereon, in a pattern corresponding to the orifice pattern on the columnating plates, and tend to unevenly cook the food items despite the fact that such food items are being moved relative to the columnar jet pattern by the conveyor belt. More specifically, as the food items are moved relative to the high velocity jets, a "streaked" cooking pattern is unavoidably obtained on the upper and lower surfaces of the food items.

This, however, is not the only cooking unevenness problem. It is well known that it is quite difficult to balance the air volume flow through the individual orifices of each columnating plate. This volume imbalance is most prevalent along the length of the upper and lower supply duct plenum and results in the orifices adjacent the outer end of each plenum discharging significantly more impingement air than the orifices located near the inner end of such plenum. This results in a cooking temperature imbalance laterally across the conveyor belt such that items close to one edge of the belt are cooked more than items positioned adjacent the opposite edge thereof.

Attempts have been made to rectify this lateral air delivery imbalance by vertically tapering the facing supply duct plenums so that the outer ends thereof are vertically narrower than their inner ends which are connected to the supply fan. While this somewhat alleviates this particular air imbalance problem, it does not completely solve it. This is due to the fact that the flat columnating plates, with their circular jet-forming orifice members, are quite sensitive to the flow characteristics of air being supplied to the duct plenums which they partially define. More specifically, it has been found that it is rather difficult, even with the tapered duct design, to achieve uniform air volume discharge through the various orifices except within a rather limited air inlet velocity range.

Stated otherwise, the duct plenums utilizing these columnating plates must be "tuned" to a particular and rather narrow plenum inlet velocity range. An inlet velocity which is either too high or too low will cause a significant air discharge imbalance among the outlet orifices in a given supply duct plenum. The jet-forming orifices are also quite sensitive to the presence of air turbulence within the particular supply plenum. Thus, even if the inlet velocity to the plenum is within the predetermined "tuned" range, turbulence in the inlet air flow will also unbalance the air discharge rates among the orifices in the plenum.

These various air discharge imbalance problems result in unavoidable cooking imbalances laterally across the conveyor belt as well as imbalances between the upper and lower surfaces of a given food item. These imbalance problems, of course, are also present when food cooling air is being supplied through the upper and lower plenums.

It is often desirable to heat (or cool) the upper and lower surfaces of food items at different rates as they traverse the tunnel. This adjustment is typically achieved by varying the relative amounts of air supplied to the upper and lower duct plenums. For example, if it is desired to lower the cooking (or cooling) rate on the upper surface of the food items, the volume of air supplied to the upper duct plenum is reduced relative to the air supplied to the lower duct plenum. This is conventionally accomplished by providing plenum inlet dampers to selectively vary the inlet volume to each of the duct plenums. However, the use of such inlet dampers unavoidably alters the plenum inlet velocity and imparts varying degrees of air turbulence within the plenums. Thus, while the total air discharged from either of the duct plenums may indeed be varied, this air supply regulation scheme can and often does alter the critical velocity "tuning" of either or both of the supply duct plenums which, in turn, creates an air discharge imbalance along the length of either or both of the plenums.

It is also often necessary to vary the relative air supply volumes between the upper and lower duct plenum in this manner to compensate for food items having varying heights. Specifically, higher items (which are positioned closer to the upper supply duct plenum) must have, along their upper surfaces, a lower air impingement velocity and/or a lesser volume of heated or cooled air emanating from the upper supply plenum duct. However, regulation of the relative volumes discharged from the upper and lower duct plenums unavoidably creates the orifice supply imbalance problem previously mentioned.

In addition to these air flow control problems, conventional air impingement tunnel ovens utilizing this columnated jet supply scheme are also subject to problems arising from the very high velocity of the heating or cooling air jets. Specifically, because of the very high velocity thought necessary to achieve proper impingement air cooling or heating, the jets, after impinging upon and being deflected from the food items, are left with a residual velocity which is still quite high. This tends to stratify the air flow within the oven which results in the possibility of "starving" and cavitating the supply fan used to deliver heated or cooled air to the upper and lower supply duct problem can necessitate the rebalancing of the impingement air system to satisfy the fan operating characteristics. In turn, however, this can lead to the uneven heating or cooling characteristics previously mentioned.

Another problem heretofore associated with this columnated jet type of food heat treatment apparatus is that it is essential to keep the food items moving relative to the circularly cross-sectioned high velocity air jets to avoid even more unevenness in the food cooking or cooling process. Specifically, if the food items are stopped for any appreciable length of time within the tunnel, the columnar jets will simply cook (or cool) the upper and lower surfaces of the food items only or discrete, spaced locations thereon. This inability to heat or cool the food items in a stationary position within the tunnel, of course, greatly limits the operational flexibility of the oven since it may be desirable in many instances to provide a longer cooking time than that available with a given tunnel length and conveyor system speed.

A further limitation associated with conventional air impingement tunnel oven cooking apparatus is the inability to safely grill meat items therein, the cooking capability of such apparatus being essentially limited to baking operations in which no appreciable amounts of grease are generated. This is due to the fact that because of the necessarily high velocity of the columnar air jets, and the uneven cooking patterns resulting therefrom, it has been necessary to elevate the air jet temperature to above the combustion "flash point" of grease vapor to achieve an actual grilling of meat products traversing the oven tunnel. Because of this necessity, grease fires are easily started in conventional air impingement tunnel ovens and they are accordingly not normally utilized to grill meat products.

It is accordingly an object of the present invention to provide tunnel oven apparatus which has an improved impingement air delivery system that eliminates or minimizes above-mentioned and other problems and limitations associated with conventional columnar jet high velocity impingement air systems.

SUMMARY OF THE INVENTION

In carrying out principles of the present invention, in accordance with a preferred embodiment thereof, improved air impingement tunnel oven apparatus is provided which comprises wall means for defining a horizontally extending heating passage, and conveyor means for moving a food item through the passage. Upper and loWer plenum means are disposed within the passage and respectively positioned above and below the conveyor means portion therein. Vertically facing laterally inner wall portions of the upper and lower plenum means have a mutually spaced array of rectangularly cross-sectioned air slots formed therein for discharging air received by the plenum means in the form of an array of rectangularly cross-sectioned jets that are directed generally transversely toward the conveyor means and begin to diffuse just prior to striking food items carried thereon. In this manner, the rectangularly cross-sectioned impingement jets strike the upper and lower surfaces of the food item in an overlapping pattern which assures rapid and even cooking of the food items as they traverse the passage.

Fan means are provided for transferring air from within the passage into the upper and lower plenum means, and heat transfer means are provided for selectively regulating the temperature of the air supplied to upper and lower plenum means by the fan means. Balancing means, in the form of internal ridges extending along the inner surfaces of the laterally inner wall portions of the plenum means are provided for facilitating the even distribution to the air slots of air entering the first and second plenum means, the air slots being positioned between such ridges.

According to a feature of the present invention, the upper plenum means are vertically movable relative to the conveyor means to compensate for varying heights of the food items being cooked in the oven. According to another aspect of the invention, separate supply fans are provided for the upper and lower plenum means to provide for a more positive adjustment of the total air flow through each of the plenum means.

According to a further aspect of the invention, the ridges in the lower plenum means are sloped and define drain troughs for receiving and draining away liquid falling from the food items being cooked.

The tunnel oven apparatus of the present invention provides a wide variety of advantages over conventional air impingement tunnel oven which utilize columnated, circularly cross-sectioned jets of air to cook food items passing through the tunnel. For example, the rectangularly cross-sectioned heating air jets of the present invention, which begin to at least slightly diffuse prior to impinging upon the food items, do not cause "streaking" on the food item surfaces. Instead, the array of rectacgular jets, upon striking the food items, have at least slightly overlapped to afford a very even cooking pattern on the food items. Because of this feature, the tunnel oven of the present invention can be used to cook the food item without a continuous movement of the conveyor means through the tunnel. Accordingly, if a longer cooking time is needed, the conveyor means can be simply stopped within the tunnel with the food items positioned appropriately between the upper and lower plenum means.

Additionally, it has been found that the rectangularly cross-sectioned air discharge slots formed in the laterally inner wall portions of the upper and lower plenum means are considerably less sensitive to variations in the plenum air inlet velocity. More specifically, overall air distribution to such slots is inherently more even, over a considerably wider inlet velocity range, than is the case where circular orifices are utilized. This inherent self-balancing feature is greatly augmented by the present invention's provision of the internal balancing ridges within the upper and lower plenum means. These balancing features of the present invention substantially eliminate air delivery variation across the plenum means in a direction transverse to the movement of food items through the tunnel.

The tunnel oven of the present invention provides for significantly increased cooking flexibility compared to air impingement ovens which utilize conventional columnated impingement jets. Specifically, the total air flow through either or both of the upper and lower plenum means may be easily adjusted by adjusting the speed of either or both of the separate supply fans. Importantly, such adjustment of the air volume supplied to the upper and lower plenum means may be effected without creating an air discharge imbalance among the various air slot openings. This advantageous cooking flexibility is further enhanced by the capability of vertically adjusting the upper plenum means to thereby equalize the distance between the air slot openings and the food item surfaces which they face.

The unique air delivery balancing feature of the present invention also eliminates the necessity to construct specially tapered air supply plenum structures. The upper and lower plenum means in the present invention may be conveniently formed with constant rectangular cross-sectional areas along their lengths.

The fan stratification problems associated with conventional columnated jet air impingement cooking systems is also eliminated in the present invention by utilizing rectangularly cross-sectioned jets which begin their diffusion process prior to impinging upon the food items being cooked. Because of this controlled diffusion technique, there is little if any air stratification within the oven tunnel and the air supply fans are accordingly assured of receiving a sufficient return air inlet flow.

Because of the air cooking pattern uniformity achieved in the present invention via its unique utilization of rectangularly cross-sectioned cooking air jets which begin to diffuse or "plume" prior to impingement on the food items, meat products may be safely grilled in the tunnel oven using air jet temperatures well below the combustion flash point temperature of grease vapor. To take advantage of this unique aspect of the present invention, the tunnel oven thereof may be provided with a conveyor system comprising an upper grill belt and a lower grill belt, each of which is in a driven loop configuration and consists of adjacent grate-like grill segments. Meat products to be grilled are placed and held between facing horizontal portions of the loops which move through the tunnel so that the meat is simultaneously heated and grilled on upper and lower surfaces thereof. Means are provided for selectively adjusting the distance between the facing horizontal portions of the grill loops to accommodate meat products of varying heights.

It can be seen that the present invention provides a substantially improved air impingement tunnel oven cooking apparatus which obviates many of the problems and disadvantages commonly associated with conventional ovens using high velocity columnated heating air jets. It will be appreciated by those skilled in this particular art that the impingement air delivery system of the present invention may alternately be utilized to provide cooling air to the food items traversing the tunnel if desired. In such case, the air supplied to the upper and lower plenum means would be appropriately cooled instead of heated.

DETAILED DESCRIPTION

Figures 1, 5:
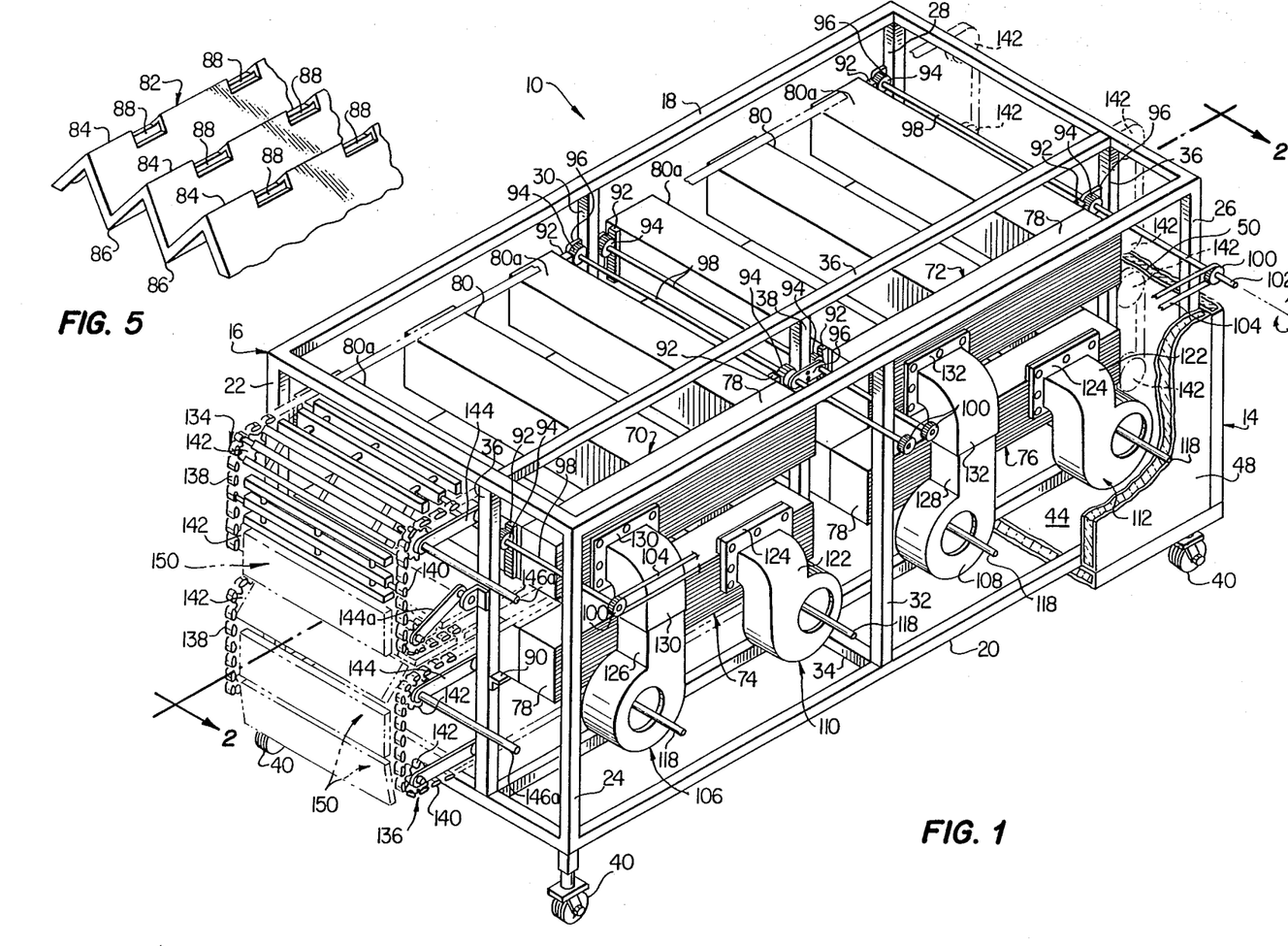
FIG. 1 is a partially cut-away rear perspective view of an improved air impingement tunnel oven which embodies principles of the present invention, with various portions of the oven structure being phantomed, removed or schematically depicted for the purpose of illustrative clarity.
FIG. 5 is an enlarged scale fragmentary perspective view of one of the jet curtain plates through which heated impingement air is flowed against food items traversing the interior of the tunnel oven.
Figure 2:
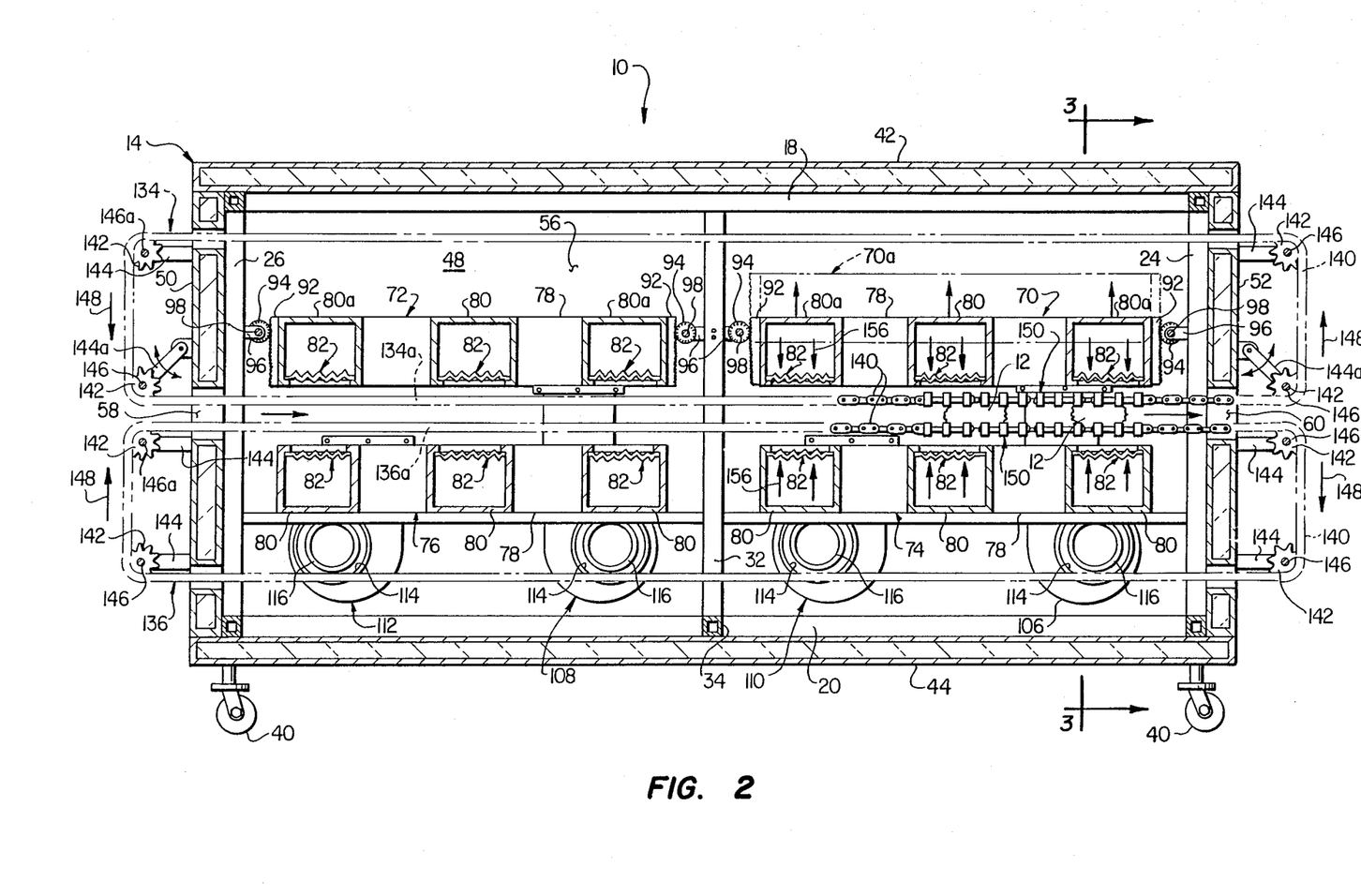
FIG. 2 is an enlarged scale cross-sectional view through the tunnel oven taken along line 2—2 of FIG. 1.
Figure 3:
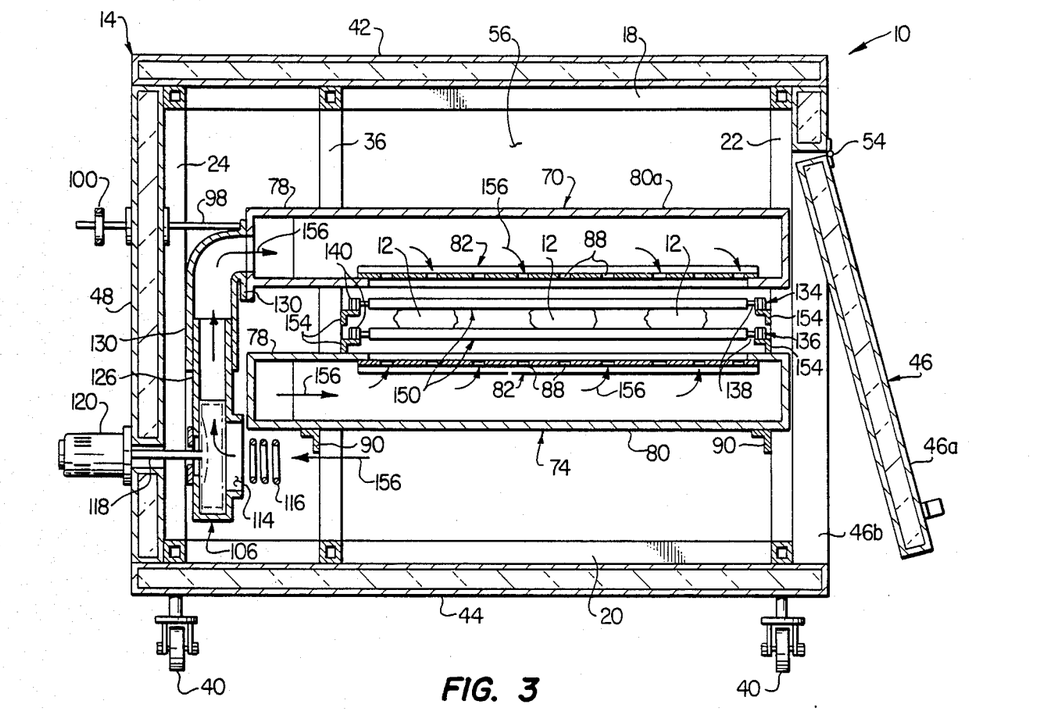
FIG. 3 is a cross-sectional view through the tunnel oven taken along line 3—3 of FIG. 2.

Illustrated in FIGS. 1-3 is an improved air impingement tunnel oven 10 which embodies principles of the present invention and may be advantageously utilized in a unique manner to simultaneously grill opposite sides of food items such as the meat portions 12 representatively depicted in FIGS. 2 and 3. The oven 10 includes a generally rectangular, horizontally elongated housing 14 having an internal framing structure 16 which is best illustrated in FIG. 1. The framing structure comprises upper and lower horizontally extending rectangular frame portions 18 and 20 which are vertically spaced apart and intersecured at their corners by vertically extending frame elements 22, 24, 26, and 28. The frame sections 18, 20 are also intersecured, adjacent the front and rear sides of the housing 14 respectively, by vertically extending intermediate frame elements 30 and 32, the lower ends of these latter frame elements being intersecured by a horizontally extending lower frame element 34. Positioned inwardly from the vertical frame element 32 is a vertically disposed rectangular frame portion 36 which is intersecured at its corners to the upper and lower rectangular frame portions 18 and 20. The upper and lower segments of the frame portion 36 are intersecured by a vertically extending frame element 38 which is generally aligned with the vertical frame elements 30 and 32. If desired, the corners of the lower rectangular frame portion 20 may be provided with suitable wheel assemblies 40 so that the tunnel oven 10 may be conveniently moved between various cooking locations.

As indicated in FIGS. 1-3, the framing structure 16 has exteriorly secured thereto in a suitable manner insulated hollow metal walls which define the external wall portion of the housing 14. Such insulated walls include an upper wall 42, a lower wall 44, a front wall 46, a rear wall 48, a left end wall 50, and a right end wall 52. As best illustrated in FIG. 3, the front wall 46 is formed in two horizontally adjacent segments 46$_a$ and 46$_b$ which are hinged at their upper ends, as at 54, so that the wall segments maybe be swung outwardly to provide access to the interior of the housing 14.

These insulated exterior walls define within the housing 14 a horizontally extending heat treatment passage or "tunnel" 56 through which the food items 12 are conveyed in a manner subsequently described. Vertically intermediate openings 58 and 60 (FIG. 2) formed in the end walls 50 and 52, respectively, form food item entrance and exit openings to the tunnel 56.

Disposed within the housing 14 are a side-by-side pair of upper supply plenum duct assemblies 70 and 72, and a side-by-side pair of lower supply plenum duct assemblies 74 and 76, assembly 74 being disposed beneath assembly 70, and assembly 76 being disposed beneath assembly 72. As best illustrated in FIG. 2, the upper duct assemblies are positioned slightly above the tunnel entrance and exit openings 58 and 60, while the lower duct assemblies are positioned slightly below such openings.

Each of these four plenum duct assemblies includes an elongated, horizontally extending inlet or base portion 78 which is positioned generally between the housing frame elements 24 and 36 (FIG. 3), is parallel to the length of the housing 14, and has a rectangular cross-section. Extending transversely to each of these duct base portions 78 toward the front housing wall 46 are three rectangularly cross-sectioned supply ducts or "jet fingers" 80 which are grouped in vertically spaced pairs (FIG. 2) such that each supply duct 80 of one of the upper plenum duct assemblies 70, 72 is positioned directly above and vertically spaced from one of the supply ducts 80 of one of the lower plenum duct assemblies 74, 76. The facing, laterally inner walls of these supply duct pairs are defined, along outer portions of their lengths, by jet curtain plates 82 which function in a manner subsequently described as impingement air distribution members.

As best illustrated in FIG. 5, each of the jet curtain plates 82 has, along its length, a corrugated cross-section defined by contiguous, alternating series of generally V-shaped ridges 84 and 86 which extend parallel to the lengths of the supply ducts 80. Ridges 84 of the jet curtain plates 82 in the lower supply ducts 80 project upwardly, while the ridges 84 of the jet curtain plates in the upper supply ducts 80 project downwardly. Formed in apex regions of the ridges 84 along their lengths are mutually spaced series of generally rectangularly shaped air slot openings 88 as may best be seen in FIG. 5 which depicts a representative portion of a jet curtain plate 82 of one of the lower supply ducts 80.

The lower supply plenum duct assemblies 74, 76 are fixedly secured within the housing 14 by means of suitable mounting brackets 90 secured to the vertical internal frame elements 22 and 36 as depicted in FIG. 3. The upper duct assemblies 70 and 72, however, are supported within the housing 14 for selective vertical movement relative thereto by rack members 92 (FIGS. 1 and 2) which are secured to the horizontally outer supply ducts $80_a$ in the duct assemblies 70 and 72, and cooperating pinion gears 94 which are operatively mounted on the vertically extending internal frame elements 22, 36, 30, 38, and 28 by suitable support brackets 96. The pinion gear pairs 94 associated with each of the four upper supply ducts $80_a$ are operatively interconnected by elongated drive shafts 98 which extend parallel to the upper supply ducts $80_a$ as best illustrated in FIG. 1. These four drive shafts 98 are provided at their rear or outer ends, which project outwardly through the rear housing wall 48 as depicted in FIG. 3, drive pinions 100. The right-most drive shaft 98 (FIG. 1) is provided with a rearward extension 102 which may be rotationally driven (in a conventional manner not illustrated) to simultaneously drive the four drive pinions 100, via a suitable interconnecting drive chain system 104 (only a portion of which is illustrated in FIG. 1) to simultaneously rotate the pinions 94 in appropriate directions to thereby selectively adjust the vertical positions of supply duct plenum assemblies 70, 72 relative to the lower duct assemblies as representatively illustrated by the phantom line position $70_a$ of the upper duct assembly 70 in FIG. 2. This selective upward and downward movement of the duct assemblies 70, 72 results, of course from the interaction between the pinion gears 94 and the rack members 92 on the upper supply ducts $80_a$. As will subsequently be seen, this unique plenum adjustment feature of the present invention significantly enhances the cooking flexibility of the tunnel oven 10.

Heated cooking air from within the housing 14 is respectively supplied to the plenum supply duct assembly 70, 72, 74 and 76 by four separate supply fans 106, 108, 110 and 112 mounted within the housing 14 adjacent the intersection of the rear housing wall 48 and the lower housing wall 44. Each of these four supply fans has a forwardly facing circular inlet 114 (FIGS. 2 and 3), an electric heating coil 116 aligned with and positioned just forwardly of the inlet, a drive shaft 118 extending outwardly through the rear housing wall 48, and a motor 120 (one of which is depicted in FIG. 3) suitably secured to the rear housing wall 48.

The outlets of fans 110 and 112 (FIG. 1), respectively, are communicated with the base duct portions 78 of the lower duct assemblies 74, 76 by means of short outlet ducts 122 secured to such base duct portions by suitable mounting brackets 124. The outlets of fans 106 and 108, respectively, are provided with vertically extending outlet ducts 126, 128 that are slidably and telescopically received in upper supply duct sections 130 and 132 that are in turn secured to the base duct portions 78 of the upper plenum duct assemblies 70, 72 by mounting brackets 130 and 132. This unique sliding connection between the fan supply ducts 126, 128 and the upper duct sections 130, 132 permits the upper duct assemblies 70, 72 to be freely moved by the aforementioned rack and pinion means relative to the stationary supply fans 106 and 108.

The food items 12 are moved through the tunnel 56, between the facing jet curtain plates 82 of the horizontally aligned pairs of supply ducts 80 by means of a conveyor system which includes upper and lower grill loops 134 and 136 as illustrated in FIGS. 1–3 (upper and lower sections of such grill loops being deleted from FIG. 3). Each of the grill loops 134, 136 includes a pair of looped roller chains 138 and 140, the upper grill loop 134 encircling the upper supply ducts 80 and the lower grill loop 136 encircling the lower supply ducts 80 as best illustrated in FIG. 2. Also as illustrated in FIG. 2, the grill loops 134 extend generally transversely to the supply ducts 80 and have facing interior portions $134_a$ and $136_a$ which are disposed in a vertically spaced relationship within the housing interior between the upper and lower supply ducts 80. Outer end portions of the two grill loops 134, 136 are positioned outwardly adjacent the housing end walls 50, 52 and are rotatably supported at corner portions thereof by suitable sprockets 142 which operatively engage the roller chains 138 and 140 and are secured to the housing 14 by mounting brackets 144.

In a conventional manner, the lower mounting brackets $144_a$ of the upper grill loop 134 are pivotable in the directions indicated (FIG. 2) to selectively vary the height of the interior grill loop section $134_a$ relative to the interior grill loop section $136_a$, to thereby adjust the distance between the two interior grill loop sections, to thereby accommodate different thicknesses of the food items 12. Specifically, by pivoting the brackets $144_a$ outwardly from the housing end walls 50, 52 the grill loop section $134_a$ will be moved upwardly relative to the grill loop section $136_a$, while inward pivoting of the brackets $144_a$ will decrease the distance between the grill loop interior sections $134_a$ and $136_a$.

As best illustrated in FIG. 2, laterally opposed pairs of the sprockets 142 are interconnected by suitable connecting rods 146. The upper left connecting rods 146 of the upper and lower grill loops 134, 136 (as viewed in FIGS. 1 and 2) are rearwardly extended to define drive shafts $146_a$ which may be suitably driven (by a conventional drive system not illustrated) to simultaneously rotate the grill loops 134, 136 in the directions indicated by the arrows 148 in FIG. 2 to horizontally advance the food items 12 positioned between the interior grill loop sections $134_a$, $136_a$ through the tunnel 56 in a rightward direction as viewed in FIG. 2.

Figure 4:
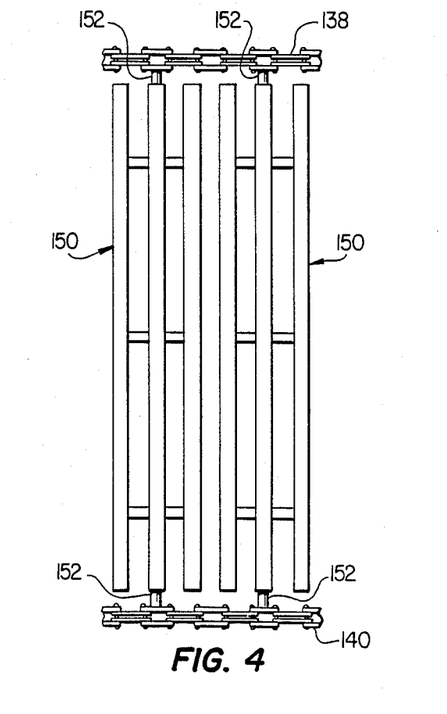
FIG. 4 is a fragmentary, enlarged scale plan view of a portion of the conveyor system used to move food items through the oven, and illustrates a representative pair of individual grate sections operatively connected between roller chain portions of the conveyor system.

As illustrated in FIG. 4, each of the grill loops 134, 136 includes a series of individual grate sections 150 which are operatively secured between the grill loop chains 138, 140 for movement therewith by means of small end pins 152 appropriately secured to such chains. To prevent sagging of the elongated portions of the grill loops 134, 136 disposed within the housing 14, the chains 138 and 40 may be supported within the housing at spaced apart locations thereon by suitable support brackets such as brackets 154 (FIG. 3) secured to vertically extending internal support members such as members 36 and 22.

During operation of the tunnel oven 10, with the grill loops 134, 136 being driven in the directions indicated, food items 12 are conveyed on a suitable transport mechanism (which is of conventional design and not illustrated) into the left end of the conveyor system (as viewed in FIG. 2) so that each of the food items is supported between facing grate sections 150 of the upper and lower grill loops 134 and 136. Simultaneous rotation of the grill loops, at equal speeds, horizontally moves the food items 12 between each successive vertically opposed pair of the supply ducts 80 toward the right or exit end of the tunnel oven. As the food items exit the tunnel oven they are transferred to conventional receiving apparatus (not illustrated).

The four supply fans 106, 108, 110 and 112 draw air 156 from within the housing 114 into their inlets 114 across the electric heating elements 116. Heated air entering the supply fans is forced upwardly into the base duct portions 78 of the upper supply duct plenum assemblies 70, 72 and the lower plenum supply duct assemblies 74, 76 through the previously described supply ductwork connected to the fan outlets. The heated air entering the base duct portions 78 is forced horizontally outwardly through the twelve supply ducts or jet fingers 80 and then is forced laterally outwardly from these supply ducts through the rectangularly cross-sectioned air slots 88 in the jet curtain plates 82 therein. The rectangularly cross-sectioned jets of heated cooking air 156 then impinge upon the grate sections 150, and upon upper and lower surfaces of the food items 12 supported therebetween, to thereby heat and grill the food items 12 from both sides. Finally, the air 156, after performing its impingement heating function, is drawn downwardly and laterally into the inlets 114 of the supply fans and across the heating elements 116.

The tunnel oven 10 just described provides a wide variety of advantages over air impingement tunnel ovens of conventional construction. For example, the unique adjustment capabilities of the upper plenum supply duct assemblies 70 and 72 permit the tunnel oven to be quickly adapted to not only varying heights of the food items 12 (this capability being augmented by the vertical adjustment capability in the grill loop section $134_a$) but also permits the tunnel oven be used in applications wherein it is desirable to impart more or less cooking heat to the upper surfaces of the food items 12 compared to the cooking heat supplied to their lower surfaces by the lower supply ducts 80. More specifically, if, while the food items are traversing the oven's tunnel it is desired to cook the upper surfaces of the food items more thoroughly than the lower surfaces, the upper duct assemblies 70 and 72 may be lowered so that they are closer to the food items then are the lower duct assemblies 74 and 76. Correspondingly, if less heat is desired on the upper food product surfaces, the upper duct assemblies can be raised so that they are considerably further from the food items than are the lower duct assemblies.

Additionally, the noncircular air slot openings 88 in the jet curtain plates 82 cause the heated impingement air jets emanating therefrom to at least slightly diffuse or "plume" before striking the food items 12. This pluming of the rectangularly cross-sectioned heated air jets causes them to strike the food items in an overlapping pattern which produces extremely even cooking of the upper and lower surfaces of the food items without the "streaked" cooking patterns obtained when conventional, circularly cross-sectioned columnar air jets are utilized. This unique air cooking pattern permits the food items to be moved very slowly through the tunnel 56 or, if desired, be stopped completely therein to provide an even longer cooking period for such food items.

The unique use of the rectangularly cross-sectioned air slots 88 in the jet curtain plates 82 also function in an advantageous manner to inherently balance the cooking air distribution along the lengths of the upper and lower supply ducts 80. More specifically, the noncircular configuration of such air slots to a large degree eliminates "hot" or "cold" spots along the lengths of such supply ducts 80 which, in the case of circularly cross-sectioned air jets has conventionally led to uneven cooking of the food products traversing the oven tunnel.

This inherent air flow balancing along the lengths of the supply ducts 80 is further enhanced by the laterally outwardly projecting ridges 86 on the jet curtain plates, such ridges 86 uniquely functioning as balancing means to facilitate the even distribution of heated air 56 being supplied to the ducts 80 to the various air slots 88 therein. The unique cooperation between the balancing ridges and the configuration of the air slots themselves eliminates the previous necessity of tapering the ducts 80 along their lengths to attempt to achieve this balanced air slot air flow condition.

The ridges 86 positioned between the air slots 88 may also be utilized as drain troughs to receive and drain away grease or other liquids falling from the food items 12 as they traverse and are cooked in the oven tunnel 56. To utilize the ridges 86 in this manner the lower supply ducts 80 may be given a slight degree of forward and downward slope so that the grease or other liquid travels longitudinally along these troughs whereby it may be conveniently collected in a grease channel (not illustrated) suitably associated with the outer ends of the supply ducts 80.

In developing the present invention, it has been found that the use of the rectangularly cross-sectioned air slots 88 renders the supply ducts 80 must less sensitive, from an air balancing standpoint, to the inlet velocity of the air 156 supplied thereto. Accordingly, each of the supply ducts 80 has been found to function very efficiently, and distribute impingement air quite evenly along its length, regardless of rather wide variations in the volumetric flow rate of impingement air supplied thereto. Stated otherwise, the air flow "tuning" requirements of conventional ducts which have circular air columnating plates installed therein are simply not a significant factor in the operation of the tunnel oven 10. This means that the individual supply fans used to flow heated impingement air into the four duct supply plenum assemblies may be individually adjusted through a wide range of air delivery rates to selectively modify the overall cooking rates for each of the plenum ducts assemblies. This feature, coupled with the adjustment capabilities of both the grill loops and the vertical positioning of the upper duct assemblies, greatly enhances the overall cooking capabilities of the improved tunnel oven 10.

Because of the very desirable "pluming" characteristics of the rectangularly cross-sectioned impingement air jets, and the resulting substantial improvements in cooking evenness, the tunnel oven 10 may be operated with air discharge temperatures substantially below the "flashpoint" temperature of any grease vapors within the housing 14. Due to this advantageous characteristic, the tunnel oven 10 may be utilized to grill meat products, on both sides thereof, without the previous concern in conventional impingement air tunnel ovens of creating grease fires within the housing 14. The diffusion of the impingement air jets prior to their striking opposite sides of the food items also permits the impingement air velocity to be maintained at a level substantially below that of previously utilized columnated air jets. Due to this ability to reduce impingement velocity, an even and uniform return of the impingement air to the supply fans is assured. Accordingly, the previous problems of supply fan "starvation" and/or cavitation is eliminated in the present invention.

While the tunnel oven 10 is uniquely adapted to cooking various food items with substantially improved speed and uniformity, and is particularly well suited to grilling meat portions on both sides thereof, it will be appreciated that it may also be utilized to cool the food items traversing the oven tunnel, if desired. In such case, the recirculating air supplied to the upper and lower plenum supply duct assemblies would be appropriately cooled instead of heated.

Finally, in developing the tunnel oven of present invention it has been discovered that the use of this recirculating, air slot impingement cooking method substantially retards the onset of rancidity of the cooked foot product which, in restaurant applications, is typically placed in a holding area prior to being served to customers. This unique result significantly increases the available "shelf life" of the cooked food products which, in turn, greatly reduces the amount of cooked food which must be discarded if not served in a relatively short time. While the exact mechanism of such retardation of the onset of rancidity in the cooked food products is not known at this time, it is theorized that it stems from the very rapid influx of impingement air cooking heat into the food items provided by the unique air distribution system incorporated into the tunnel oven.

The foregoing detailed description is to be clearly understood as given by way of illustration and example only, the spirit and scope of the present invention being limited solely by the appended claims.

What is claimed is:

1. Air impingement food heat treatment apparatus comprising:
   wall means for defining a housing having a generally horizontally extending heat treatment passage;
   conveyor means for moving a food item through said heat treatment passage;
   first and second plenum means for receiving air at a predetermined temperature, said first and second plenum means extending across opposite sides of a portion of said conveyor means disposed within said heat treatment passage and having laterally inner wall portions which face and are spaced apart from said portion of said conveyor means;
   air slot means, formed through said laterally inner wall portions of said first and second plenum means, for discharging air received by said first and second plenum means in the form of an array of noncircularly cross-sectioned jets which are directed generally transversely toward said portion of said conveyor means and begin to diffuse prior to striking food items carried on said portion of said conveyor means;
   fan means for transferring air from within said heat treatment passage into said first and second plenum means;
   heat transfer means for selectively regulating the temperature of air supplied to said first and second plenum means by said fan means;
   balancing means, defined by the inner surfaces of said laterally inner wall portions of said first and second plenum means, for facilitating the even distribution to said air slot means of air entering said first and second plenum means; and
   adjustment means for selectively varying the distance between at least one of said first and second plenum means and said portion of said conveyor means.

2. The apparatus of claim 1 wherein:
   one of said first and second plenum means is positioned above said portion of said conveyor means, and
   said adjustment means comprise means for selectively raising or lowering said one of said first and second plenum means relative to said portion of said conveyor means.

3. Air impingement food heat treatment apparatus comprising:
   wall means for defining a housing having a generally horizontally extending heat treatment passage;
   conveyor means for moving a food item through said heat treatment passage;
   first and second plenum means for receiving air at a predetermined temperature, said first and second plenum means extending across opposite sides of a portion of said conveyor means disposed within said heat treatment passage and having laterally inner wall portions which face and are spaced apart from said portion of said conveyor means, one of said first and second plenum means being positioned above said portion of said conveyor means;

air slot means, formed through said laterally inner wall portions of said first and second plenum means, for discharging air received by said first and second plenum means in the form of an array of noncircularly cross-sectioned jets which are directed generally transversely toward said portion of said conveyor means and begin to diffuse prior to striking food items carried on said portion of said conveyor means;

fan means for transferring air from within said heat treatment passage into said first and second plenum means;

heat transfer means for selectively regulating the temperature of air supplied to said first and second plenum means by said fan means;

balancing means, defined by the inner surfaces of said laterally inner wall portions of said first and second plenum means, for facilitating the even distribution to said air slot means of air entering said first and second plenum means; and adjustment means for selectively varying the distance between at least one of said first and second plenum means and said portion of said conveyor means, said adjustment means including means for selectively raising or lowering at least one of said first and second plenum means relative to said portion of said conveyor means, said means for selectively raising or lowering including cooperating rack or pinion mean son said housing and said at least one of said first and second plenum means, said rack and pinion means being operable to raise and lower said at least one of said first and second plenum means relative to said housing.

4. The apparatus of claim 3 wherein:

said fan means include a supply fan secured to said housing, a first vertically extending supply duct secured to the outlet of said supply fan, and a second vertically extending supply duct secured to said one of said first and second plenum means and communicating with its interior, said first and second supply ducts being slidably and telescopingly interconnected to permit vertical movement of said second supply duct relative to said first supply duct during a height adjustment of said one of said first and second plenum means.

5. The apparatus of claim 1 wherein:

said fan means comprise a duality of air supply fans each operatively connected to a different one of said first and second plenum means.

6. Air impingement food heat treatment apparatus comprising:

wall means for defining a housing having a generally horizontally extending heat treatment passage;

conveyor means for moving a food item through said heat treatment passage;

first and second plenum means for receiving air at a predetermined temperature, said first and second plenum means extending across opposite sides of a portion of said conveyor means disposed within said heat treatment passage and having laterally inner wall portions which face and are spaced apart from said portion of said conveyor means;

air slot means, formed through said laterally inner wall portions of said first and second plenum means, for discharging air received by said first and second plenum means in the form of an array of noncircularly cross-sectioned jets which are directed generally transversely toward said portion of said conveyor means and begin to diffuse prior to striking food items carried on said portion of said conveyor means;

fan means for transferring air from within said heat treatment passage into said first and second plenum means;

heat transfer means for selectively regulating the temperature of air supplied to said first and second plenum means by said fan means;

balancing means, defined by the inner surfaces of said laterally inner wall portions of said first and second plenum means, for facilitating the even distribution to said air slot means for air entering said first and second plenum means; and adjustment means for selectively varying the distance between at least one of said first and second plenum means and said portion of said conveyor means, said balancing means comprising a series of mutually spaced, parallel, inwardly projecting ridges formed along the inner surfaces of said laterally inner wall portions, and said air slot means being positioned between said inwardly projecting ridges.

7. The apparatus of claim 6 wherein:

said inwardly projecting ridges extend generally transversely to said portion of said conveyor means.

8. The apparatus of claim 7 wherein:

said fan means supply air into said first and second plenum means in a direction generally parallel to said inwardly projecting ridges.

9. Air impingement food heat treatment apparatus comprising:

wall means for defining a housing having a generally horizontally extending heat treatment passage;

conveyor means for moving a food item through said heat treatment passage;

first and second plenum means for receiving air at a predetermined temperature, said first and second plenum means extending across opposite sides of a portion of said conveyor means disposed within said heat treatment passage and having laterally inner wall portions which face and are spaced apart from said portion of said conveyor means;

air slot means, formed through said laterally inner wall portions of said first and second plenum means, for discharging air received by said first and second plenum means in the form of an array of noncircularly cross-sectioned jets which are directed generally transversely toward said portion of said conveyor means and begin to diffuse prior to striking food items carried on said portion of said conveyor means;

fan means for transferring air from within said heat treatment passage into said first and second plenum means;

heat transfer means for selectively regulating the temperature of air supplied to said first and second plenum means by said fan means;

balancing means, defined by the inner surfaces of said laterally inner wall portions of said first and second plenum means, for facilitating the even distribution to said air slot means of air entering said first and second plenum means; and adjustment means for selectively varying the distance between at least one of said first and second plenum means and said portion of said conveyor means, said laterally inner wall portions of said first and second plenum means having cross-sections defined by alternating series of ridges which respectively project toward and away from said portion of said conveyor means, said balancing means comprising said series of ridges which project away from said portion of said conveyor means, and said air slot means being formed in said series of ridges which project toward said portion of said conveyor means.

10. The apparatus of claim 9 wherein:
said ridges extend generally transversely to said portion of said conveyor means.

11. The apparatus of claim 10 wherein:
said fan means supply air into said first and second plenum means in a direction generally parallel to said ridges.

12. The apparatus of claim 9 wherein:
one of said first and second plenum means is positioned beneath said portion of said conveyor means, and
said laterally inner wall portion of said one of said first and second plenum means is sloped in a direction parallel to said ridges therein so that its ridges which project away from said portion of said conveyor means define sloped drainage troughs for receiving and draining away liquids from food items passing over said one of said first and second plenum means.

13. The apparatus of claim 9 wherein:
said ridges have, along their lengths, generally V-shaped cross-sections, and
said air slot means comprise a series of rectangular air slots formed through apex regions of the ridges which project toward said portion of said conveyor means.

14. The apparatus of claim 1 wherein:
each of said first and second plenum means has, along a direction generally transverse to said portion of said conveyor means, an essentially constant cross-sectional area.

15. The apparatus of claim 1 wherein:
said conveyor means comprise first and second grill loops each defined by a series of adjacent grate sections, said grill loops having spaced apart, facing straight sections movable through said heat treatment passage and adapted to support food items therebetween.

16. The apparatus of claim 15 further comprising:
means for selectively adjusting the distance between said facing straight sections of said grill loops.

17. The apparatus of claim 1 wherein:
said jets have generally rectangular cross-sections.

18. Gas impingement apparatus for thermally treating food items, comprising:
wall means for defining an elongated, generally horizontally extending passage;
conveyor means for moving a food item horizontally through said passage, said conveyor means having a portion thereof disposed within said passage;
plenum means, extending across said portion of said conveyor means in a vertically spaced relationship therewith, for receiving a gas at a predetermined temperature, said plenum means having a laterally inner wall portion facing said conveyor means;
a mutually spaced array of noncircularly cross-sectioned gas slots formed through said wall portion for discharging gas from within said plenum means against a food item moving through said passage;
balancing means, defined by the interior surface of said wall portion, for facilitating a generally equal distribution to said gas slots of gas received within said plenum means;
fan means for supplying a flow of gas into the interior of said plenum means; and
heat transfer means for regulating the temperature of gas supplied to said plenum means by said fan means.

19. The apparatus of claim 18 further comprising:
adjustment means for selectively varying the vertical distance between said gas slots and said conveyor means.

20. The apparatus of claim 19 wherein:
said adjustment means comprise means for selectively moving a portion of said plenum means relative to said wall means.

21. The apparatus of claim 20 wherein:
said plenum means comprise upper and lower plenum ducts respectively disposed above and below sad portion of said conveyor means, and
said means for selectively moving a portion of said plenum means comprise means for selectively moving said upper plenum duct in a vertical direction.

22. The apparatus of claim 21 wherein:
said means for selectively moving said upper plenum duct in a vertical direction comprise rack an pinion means operable to raise and lower said upper plenum duct within said passage.

23. The apparatus of claim 22 wherein:
said fan means include a supply fan, a first supply duct connected to the outlet of said supply fan, and a second supply duct slidably connected to said first supply duct and operatively connected to said upper plenum duct for vertical movement therewith relative to said first supply duct.

24. Gas impingement apparatus for thermally treating food items, comprising:
wall means for defining an elongated, generally horizontally extending passage;
conveyor means for moving a food item horizontally through said passage, said conveyor means having a portion thereof disposed within said passage;
plenum means, extending across said portion said conveyor means in a vertically spaced relationship therewith, for receiving a gas at a predetermined temperature, said plenum means having a laterally inner wall portion facing said conveyor means;
a mutually spaced array of noncircularly cross-sectioned gas slots formed through said wall portion for discharging gas from within said plenum means against a food item moving through said passage;
balancing means, defined by the interior surface of said wall portion, for facilitating a generally equal distribution to said gas slots of gas received within said plenum means;
fan means for supplying a flow of gas into the interior of said plenum means; and
heat transfer means for regulating the temperature of gas supplied to said plenum means by said fan means, said balancing means comprising a mutually spaced series of parallel ridges extending along the interior surface of said wall portion of said plenum means, and said gas slots being positioned between said ridges.

25. The apparatus of claim 24 wherein:

said ridges extend generally transversely to said passage.

26. The apparatus of claim 25 wherein:

said fan means are operative to supply gas into said plenum means in a direction generally parallel to said ridges.

27. The apparatus of claim 18 wherein:

said apparatus is a tunnel oven;

said fan means are operative to supply air to said plenum means; and said heat transfer means comprise means for heating the air supplied to said plenum means by said fan means.

28. The apparatus of claim 27 wherein:

said conveyor means comprise first and second grill loops each defined by a series of adjacent grate sections, said grill loops having spaced apart, horizontally extending straight sections movable through said passage and adapted to support and grill food items placed therebetween.

29. The apparatus of claim 28 further comprising:

means for selectively adjusting the vertical distance between said horizontally extending straight sections of said grill loops.

30. The apparatus of claim 27 wherein:

said fan means are operative to supply air from within said passage to said plenum means.

31. The apparatus of claim 30 wherein:

said plenum means comprise upper and lower plenum ducts respectively disposed above and below said portion of said conveyor means, and said fan means comprise first and second air supply fans respectively connected to said upper and lower plenum ducts.

32. The apparatus of claim 31 wherein:

said upper and lower plenum ducts have essentially constant cross-sectional areas along their lengths.

33. Gas impingement apparatus for treating food items, comprising:

wall means for defining an elongated, generally horizontally extending passage;

conveyor means for moving a food item horizontally through said passage, said conveyor means having a portion thereof disposed within said passage;

plenum means, extending across said portion of said conveyor means in a vertically spaced relationship therewith, for receiving a gas at a predetermined temperature, said plenum means having a laterally inner portion facing said conveyor means;

a mutually spaced array of noncircularly cross-sectioned gas slots formed through said wall portion for discharging gas from within aid plenum means against a food item moving through said passage;

balancing means, extending along the interior surface of said wall portion, for facilitating a generally equal distribution to said gas slots of gas received within said plenum means;

fan means for supplying a flow of gas into the interior of said plenum means; and heat transfer means for regulating the temperature of gas supplied to said plenum means by said fan means, said wall portion of said plenum means having a cross-section defined by alternating series of ridges which respectively project toward and away from said portion of said conveyor means, and said balancing means being defined by said ridges.

34. The apparatus of claim 33 wherein:

said ridges are generally V-shaped.

35. The apparatus of claim 34 wherein:

said gas slots are formed along apex regions of said ridges which project toward said portion of said conveyor means.

36. A method of thermally treating a food item with a gas impingement apparatus comprising:

an elongated housing having a heat treatment passage extending longitudinally therethrough along an axis;

first and second plenum ducts each having a wall portion defined by alternating series of parallel ridges which respectively project toward and away from the interior of the plenum duct with which the wall portion is associated, each of said wall portions having a plurality of rectangular slots in the outer portions of the ridges which project away from the interior of their associated plenum duct;

said first and second plenum ducts being positioned within said heat treatment passage on opposite sides of said axis with said wall portions being laterally spaced apart from and facing said axis;

one of said first and second plenum ducts being supported for selective movement toward or away from said axis, said method comprising the steps of:

flowing a heated gas, at a predetermined temperature suitable for thermally treating the food item, into said first and second plenum ducts and outwardly through said slots in said wall portions thereof toward said axis; and conveying the food item through said passage, generally parallel to said axis and between said first and second plenum ducts, to thermally treat the food item by impingement thereon of heated gas being discharged through said slots in said wall portions of said first and second plenum ducts.

37. The method of claim 36 wherein:

said flowing step is performed by flowing heated air into said first and second plenum ducts in a direction generally parallel to said ridges.

38. The method of claim 37 wherein:

said positioning step includes positioning said first and second plenum ducts so that said ridges longitudinally extend generally transversely to said axis.

39. The method of claim 38 wherein:

said positioning step further includes positioning said first and second plenum ducts directly opposite each other.

40. The method of claim 36 wherein:

said flowing step includes connecting a separate supply fan to each of said first and second plenum ducts.

41. The method of claim 40 wherein:

said flowing step further includes the step of utilizing said supply fans to flow gas from within said passage into said first and second plenum ducts.

42. The method of claim 36 wherein:

said conveying step is performed by conveying the food item through a horizontally extending passage along a horizontal axis thereof;

said positioning step is performed by respectively positioning said first and second plenum ducts above and below said axis; and said method further comprises the step of utilizing said ridges on said second plenum duct to receive and drain away liquid falling from the food item.

43. The method of claim 36 wherein:

said conveying step includes positioning the food item between a pair of grill members and moving the grill members through said passage; and said flowing step is performed by flowing heated air into said first and second plenum ducts to thereby simultaneously heat and grill the food item along opposite sides thereof.

44. The method of claim 36 wherein:

said supporting step includes providing rack and pinion means for selectively moving said first plenum duct toward and away from said axis.

45. The method of claim 44 wherein:

said flowing step includes utilizing a supply fan maintained in a fixed orientation relative to said axis and interconnecting extensible and retractable duct means between said supply fan and said first plenum duct to permit movement of said first plenum duct relative to said supply fan.

46. Gas impingement apparatus for thermally treating food items, comprising:

wall means for defining an elongated, generally horizontally extending thermal treatment passage;

conveyor means for moving a food item horizontally through said thermal treatment passage, said conveyor means having a portion thereof disposed within said thermal treatment passage;

plenum means, extending across said portion of said conveyor means in a vertically spaced relationship therewith, for receiving a gas at a predetermined thermal food treatment temperature, said plenum means having a laterally inner wall portion facing said portion of said conveyor means, said laterally inner wall portion having a series of parallel ridges formed therein and extending along the interior and exterior surfaces thereof;

a mutually spaced array of noncircularly cross-sectioned gas slots formed through said parallel ridges for discharging gas from within said plenum means, in the form of a spaced array of noncircularly cross-sectioned thermal food treatment gas impingement jets, against a food item being moved through said thermal treatment passage by said conveyor means;

fan means for supplying a flow of gas from within said thermal treatment passage into the interior of said plenum means; and heat transfer means for regulating the temperature of gas supplied to said plenum means by said fan means.

47. Apparatus for creating an evenly distributed gas impingement flow upon an article, comprising:

wall means for defining an elongated gas treatment passage extending along an axis;

conveyor means for moving the article through said gas treatment passage generally along said axis, said conveyor means having a portion thereof disposed within said gas treatment passage;

plenum means, extending across said portion of said conveyor means in a laterally spaced relationship therewith, for receiving a gas, said plenum means having a laterally inner wall portion facing said portion of said conveyor means, said laterally inner wall portion having a series of parallel ridges formed therein and extending along the interior and exterior surfaces thereof and alternately projecting toward and away from the interior of said plenum means;

a mutually spaced array of noncircularly cross-sectioned gas discharge slots, formed through alternating ones of said parallel ridges, for discharging gas from within said plenum means in the form of a spaced array of noncircularly cross-sectioned gas impingement jets which strike the article in an evenly distributed, overlapping gas impingement pattern, as the article is moved past said plenum means by said conveyor means, to thereby accelerate heat transfer between the article and the discharged gas; and means for flowing pressurized gas into said plenum means.

* * * * *